US006653560B1

(12) United States Patent
Wu

(10) Patent No.: US 6,653,560 B1
(45) Date of Patent: Nov. 25, 2003

(54) MULTI-FUNCTIONAL DO-IT-YOURSELF LAMP STRUCTURE

(76) Inventor: Wen-Chang Wu, No.10, Lane 191, Hsi Hsin Street, Chuang Ya Tsun, Hsiu Shui Hsiang, Chang Hua Hsien (TW)

( * ) Notice: Subject to any disclaimer, the term of this patent is extended or adjusted under 35 U.S.C. 154(b) by 0 days.

(21) Appl. No.: 10/196,369

(22) Filed: Jul. 17, 2002

(51) Int. Cl.7 .................................................. H02G 3/14

(52) U.S. Cl. ........................... 174/50; 174/60; 174/135; 220/4.02; 361/600

(58) Field of Search .......................... 174/50, 48, 17 R, 174/58, 63, 53, 60, 135; 220/3.2, 3.3, 3.6, 3.8, 4.02; 248/906; 439/535; 361/600

(56) References Cited

U.S. PATENT DOCUMENTS

| | | | | |
|---|---|---|---|---|
| 4,536,612 A | * | 8/1985 | Domigan | 174/48 |
| 5,773,757 A | * | 6/1998 | Kenney et al. | 174/53 |
| 5,783,775 A | * | 7/1998 | Marusinec | 174/50 |
| 6,518,500 B1 | * | 2/2003 | Huang | 174/50 |

* cited by examiner

*Primary Examiner*—Dhiru R Patel
(74) *Attorney, Agent, or Firm*—Troxell Law Office PLLC

(57) ABSTRACT

The present invention relates to a multi-functional lamp structure for all kinds of lamps, having a hanger and an electric connector; a limit structure, pivotally coupled to the hanger, has male/female limit elements that can be extended outward by expanding the spring and pulling the draw bar; when the electric connector is inserted into the hanger, the connector section of the electric connector slides into the space aligning at the larger latching space of the hanger, and along the aslant design of the latching space until the smaller latching space of the male/female limit elements are extended outward; then the spring disposed on the top of the male/female limit members can be pulled to an appropriate extent for a deformation to let both sides of the electric connector of the embedding edge be latched exactly to the top of the male/female members; when the user needs to remove the electric connector, the draw bar should be pulled to pull the connecting bracket at th upper end of the draw bar to push the male/female limit element outward, separating the embedding edge of the electric connector and facilitating the removal of the electric connector; such arrangement can reduce the volume of the material for the transportation and storage, and make it easier for the do-it-yourself assembling by inserting the latching base into the fixed base after the user has brought the lamp home.

8 Claims, 12 Drawing Sheets

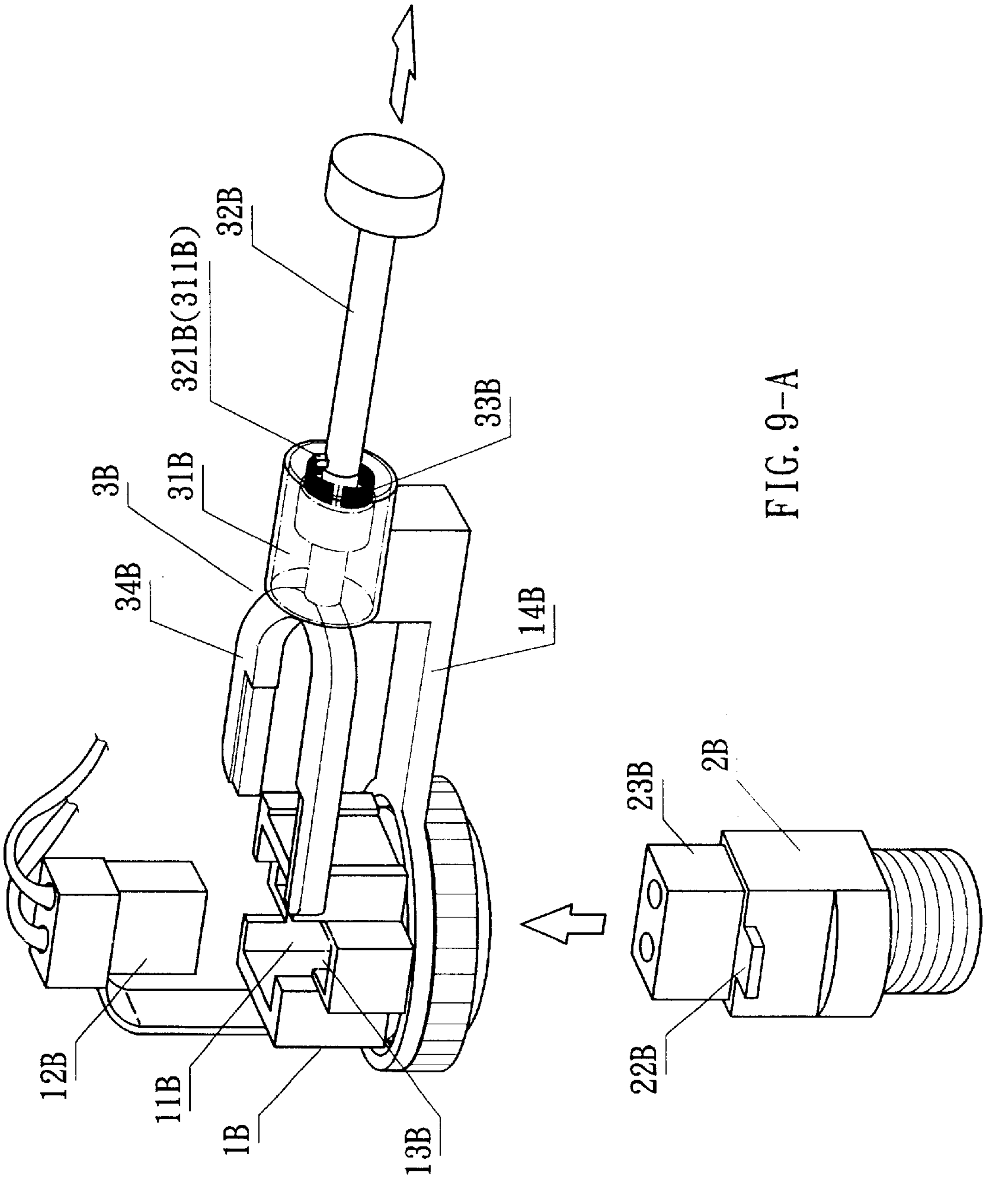
FIG. 9-A

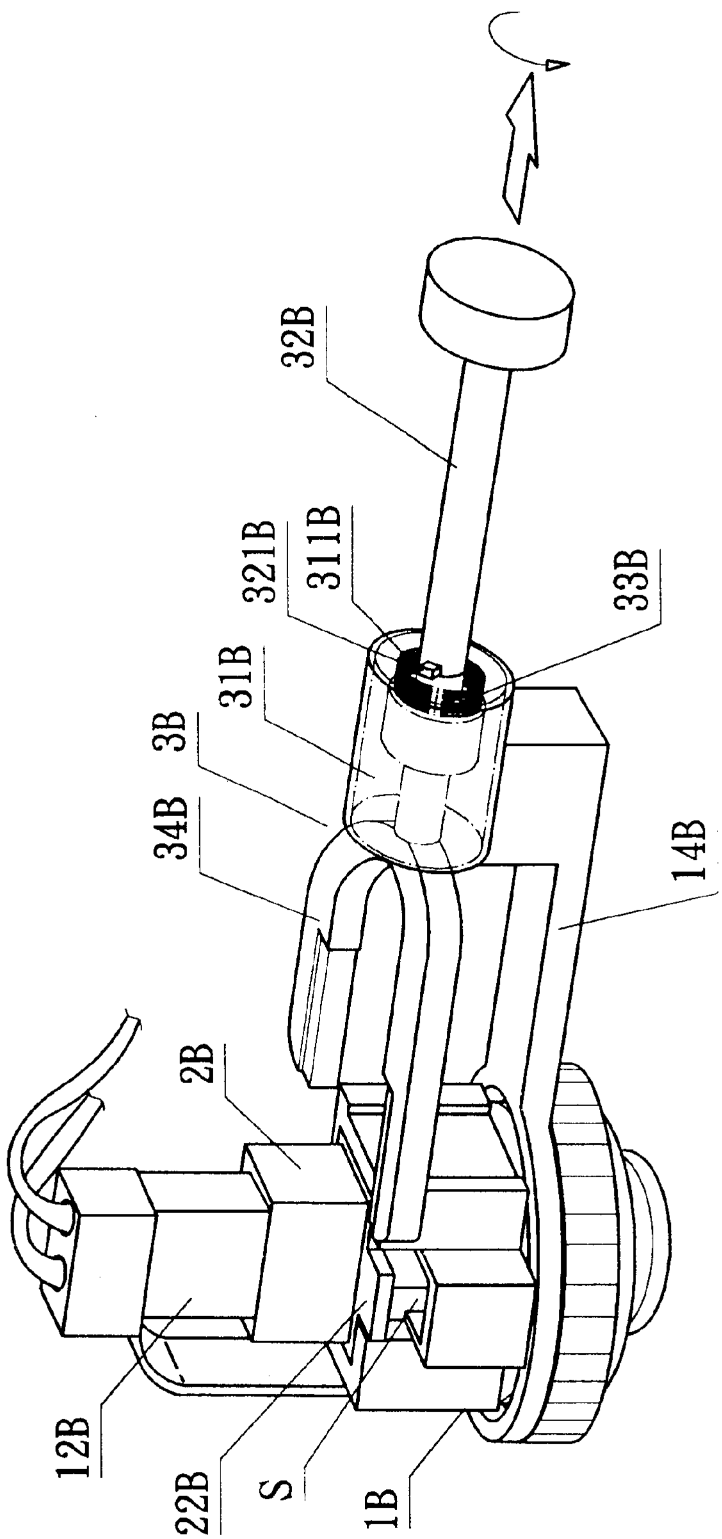
FIG. 9-B

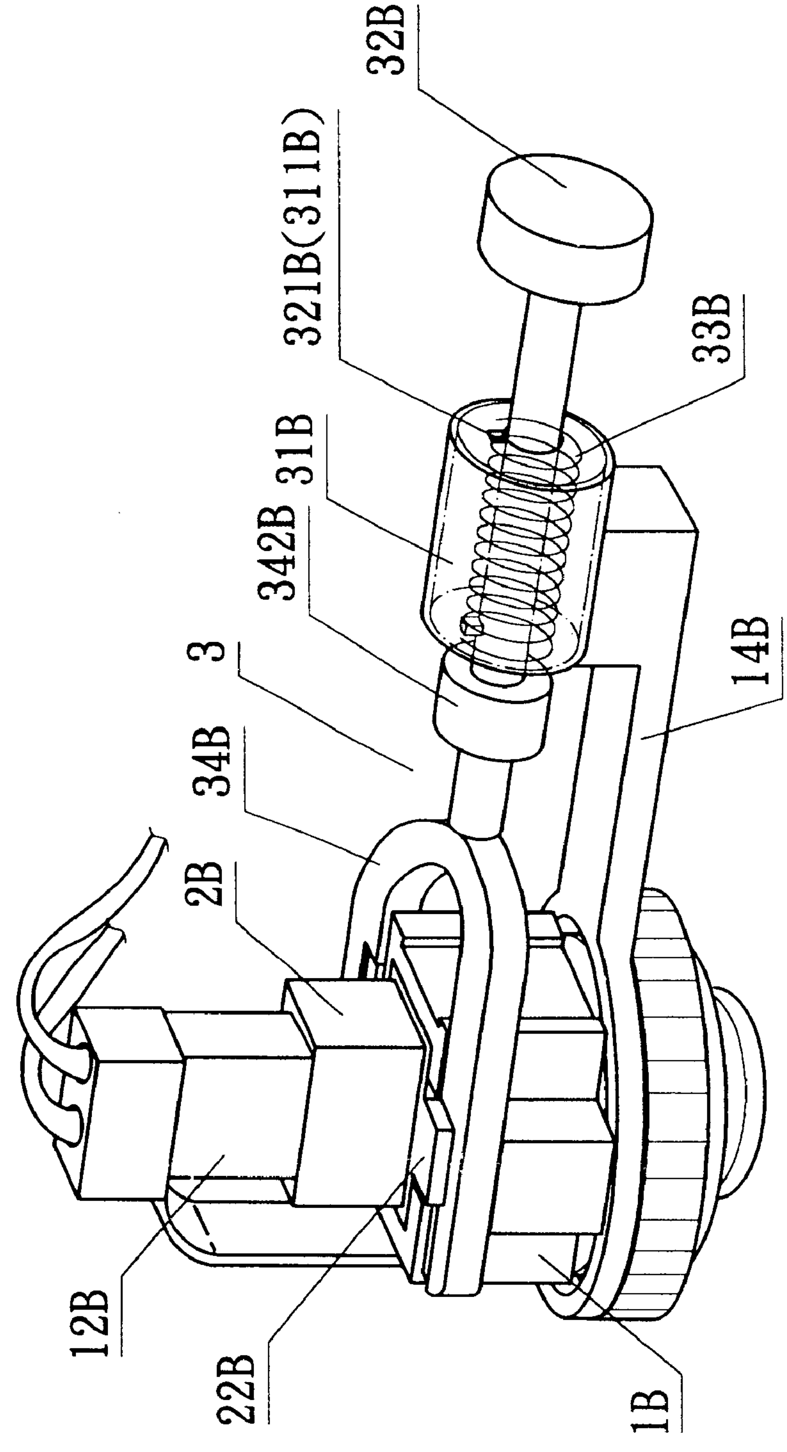
FIG. 9-C

MULTI-FUNCTIONAL DO-IT-YOURSELF LAMP STRUCTURE

BACKGROUND OF THE INVENTION (a) Field of the Invention

The present invention relates to a multifunctional lamp structure, more particularly to a do-it-yourself (DIY) lamp structure having a limit structure pivotally coupled to a hanger, and a male and a female limit members of the limit structure can be contracted and expanded by a spring; when the electric connector is inserted into the hanger, the connector section of the electric connector can press against the male and female limit elements in a smaller latching space outward to latch the latching edges on both sides of the electric connector exactly into the top of the male and female limit elements; such arrangement can reduce the volume of material for transportation and storage and makes the DIY assembling easier.

(b) Description of the Prior Art

In the prior-art lamp, the coupling structure between the lamp body and the switch box generally uses bolts and nuts for the coupling. However such assembling method using bolts and nuts may damage the goods during the assembling, and it needs tools (such as wrench and screwdriver, etc) for the assembling. The assembling may expose the wire by friction and have the risk of electric shocks, and thus cause trouble to the assembling. Therefore, it is not suitable for DIY assembling. The manufacturer needs to assemble the entire hanging lamp, before selling. It will also cause an increase in volume of material for transportation and thus increase the cost.

In the aforementioned shortcomings, the present inventor herein with many years in the related field enhances the structure of the lamp and finally invents the present invention.

SUMMARY OF THE INVENTION

The primary purpose of the present invention is to provide a multi-functional do-it-yourself (DIY) lamp structure mainly comprising a hanger and an electric connector; a limit structure, pivotally coupled to the hanger, having a male and a female limit members that can be extended outward by extending the spring and pulling the draw bar; when the electric connector is inserted into the hanger, the connector section of the electric connector slides into the space aligning at the larger latching space of the hanger, and along the aslant design of the latching space until the smaller latching space of the male land female limit elements are extended outward; then the spring disposed on the top of the male and female limit members can be pulled to an appropriate extent for a deformation and let both sides of the electric connector of the embedding edge be latched exactly to the top of the male and female members; when the user needs to remove the electric connector, the draw bar should be pulled so that the connecting bracket at the upper end of the draw bar pushes the male and female limit elements outward, separating the embedding edge of the electric connector and facilitating the removal of the electric connector; such arrangement can reduce the volume fo the material for the transportation and storage; and make it easier for the DIY assembling by inserting the latching base into the fixed base after the user has brought the lamp home.

Another objective of the present invention is to provide a multifunctional DIY lamp structure of which the electric connector of the lamp body can be detached from the switch box fore packaging, transporting, and storing in order to reduce the volume of material for transportation and storage, and the user just needs to insert the electric connector of the lamp body into the interior of the hanger without using screwing tools. Thus, such arrangement makes the DIY assembling more convenient.

BRIEF DESCRIPTION OF THE DRAWINGS

FIGS. 9A~C are diagrams showing the movement made in the lamp shown in FIG. 8.

DETAILED DESCRIPTION OF THE PREFERRED EMBODIMENTS

Figure 1:
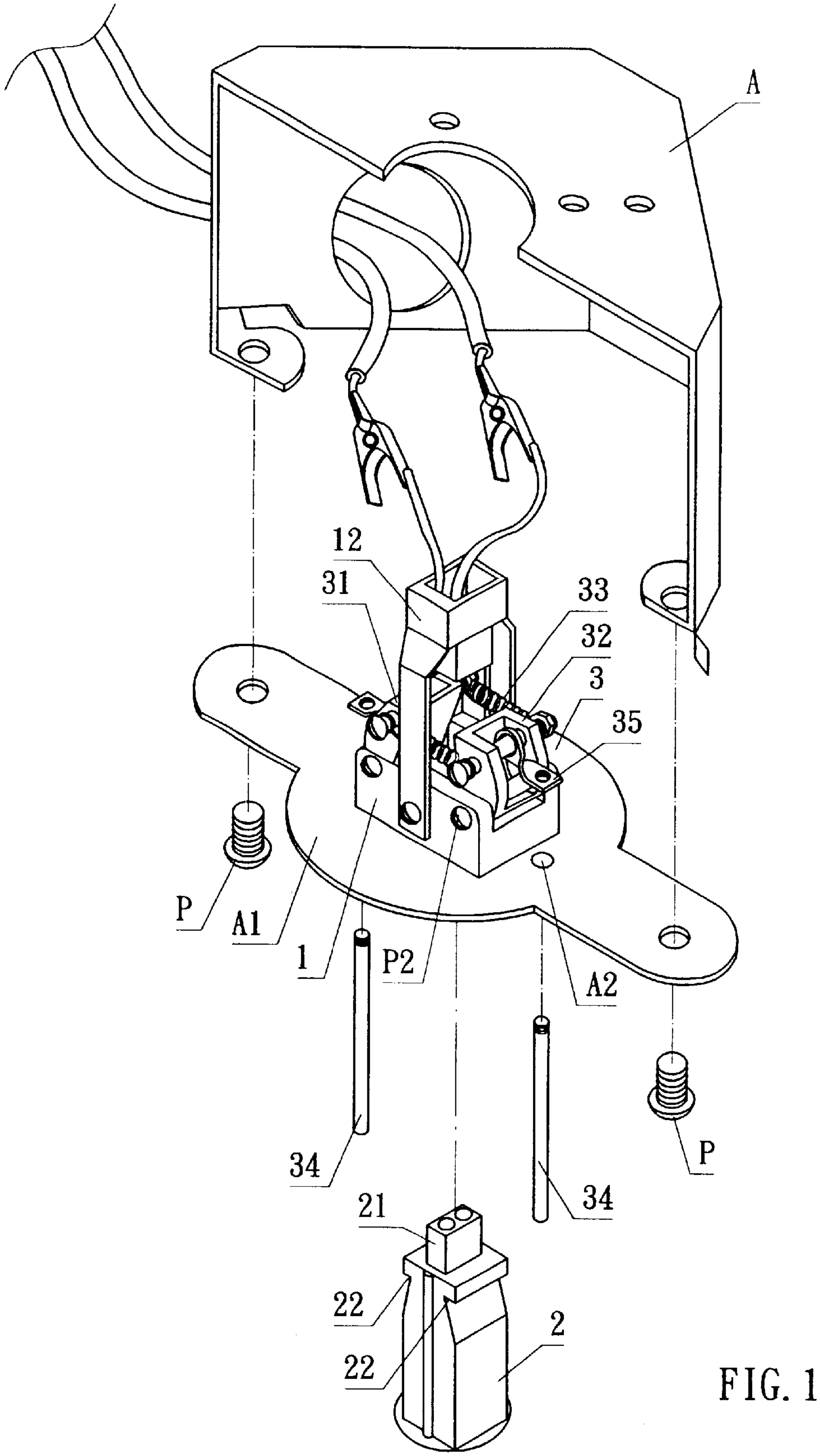
FIG. 1 is an explosive diagram of the present invention.
Figure 2:
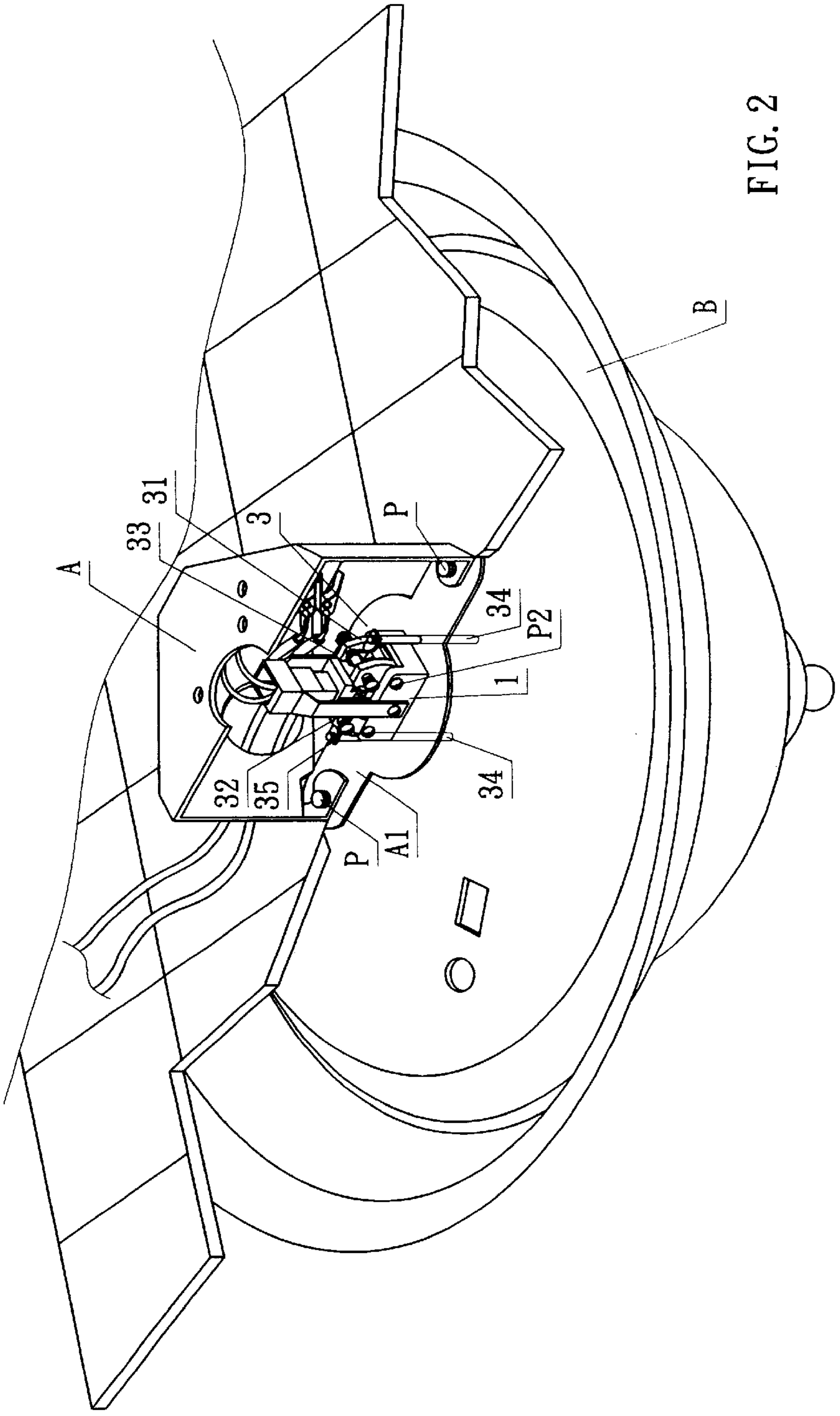
FIG. 2 is an assembly diagram of the present invention.

Please refer to FIGS. 1 and 2 for a clear understanding of the structure of the present invention. The present invention comprises a hanger 1 in the middle of the interior of the switch box A, and an electric connector fixed to the center of the lamp body; and the electric connector 2 can be inserted exactly into the interior of the hanger 1; wherein a placing platform A1 secured to both sides of the bottom of switch box A by screw bolt P such that the hanger can be disposed above the platform. A1, and a penetrating hole A2 is disposed each on the two draw bars 34 which are disposed at the appropriate position on both ends of the hanger 1 of the platform A1.

A socket 12 with electric wire is extended vertically upward on both sides, and a limit structure 3 is disposed inside the hanger 1; the limit structure 3 is fixed to the draw bar 34 on both ends of the male and female limit members by the male and female members 31, 32 on both sides of the hanger, and both sides are individually fixed to a spring 33 on the male and the female limit members 31, 32, and the spring 33 can be pulled to an appropriate extent driving the male and female limit members 31, 32 to contract inward, and the male and female limit members 31, 32 are pivotally coupled to the hanger 1 by a fixing screw P2 in order to provide a pivotal rotation at the pivotal coupling section for the male land female limit members 31, 32; the end of the male and female members 31, 32 are substantially in inclined surface forming a latching space S capable of pulling and pushing; and the draw bar 34 passes through the penetrating hole A2 on both ends of the platform of the switch box, being fixed by the connecting plate 35 and the male and female limit members 31, 32. The electric connector 2 is coupled to the top of the lamp body B in advance, and the electric connector 2 has a hanger 1 at the top of the electric connector 2, and a connector head section 21 is extended from the bottom to the top, and the top of the connector head 21 can be inserted exactly into the socket 12 of the hanger 1, and both sides of the electric connector 2 are inserted so that they can be latched into the embedding edge 22 above the male and female limit members 31, 32.

Figure 3:
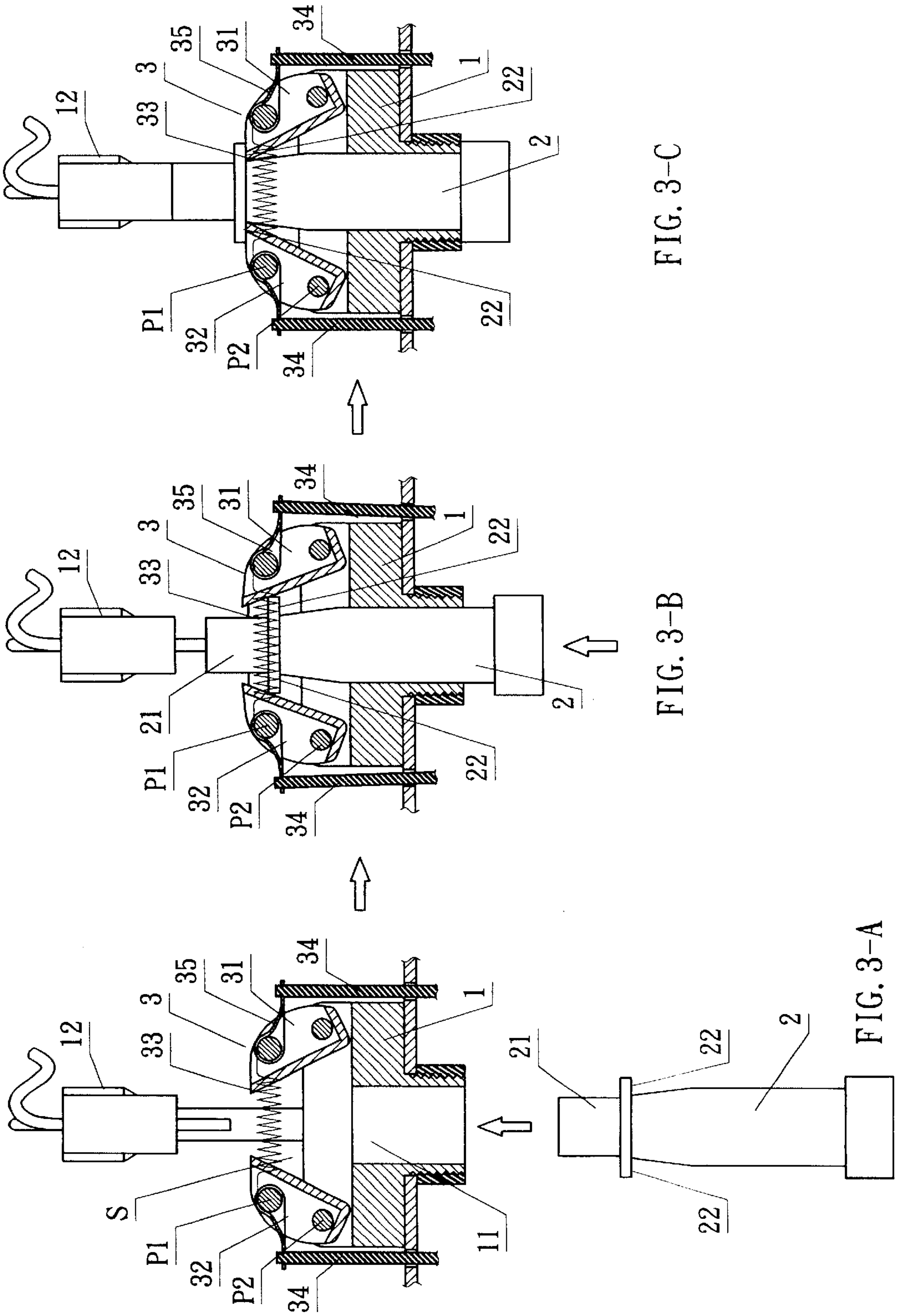
FIGS. 3A~C are the diagrams of the movement made in a preferred embodiment of present invention.

Please refer to FIGS. 3A–3C for the movement. When the electric connector 2 is not installed, the spring 33 individually fixed to both ends of the male and female limit members 31, 32 in a relax condition such that the latching space S of the male and female limit members 31, 32 is in the tapered structure (as shown in FIG. 3A); when the electric connector 2 is inserted into the hanger 1 from the bottom of the hanger 1, the connector head section 21 of the electric connector aligns with the larger latching space S formed at the center of the male and female limit members 31, 32 along the aslant design to push against the male and female limit members 31, 32 with a smaller latching space to extend outward*(as shown in FIG. 3B). Then, the spring 33 fixed on the top of the male and female limit members 31, 32 can be pulled to an appropriate extent for deformation in order to let the electric connector to inserted, and the embedding edge 22 on both sides of the electric connector 2 be latched exactly to the top of the male and female limit members 31, 32 so that it cannot be retreated (as shown in FIG. 3C).

When the user needs to remove the electric connector 2, the user just needs to pull the draw bar 34 towards its inner side, and the upper end of the draw bar 34 can be pushed. by the connecting plate 35 to drive the male and female limit members 31, 32 to extend outward to both lateral sides such that the top of the male and female limit members 31, 32 is separated from the embedding edge 22 of the electric connector, and such arrangement facilitates the removal of the electric connector 2.

Figure 4:
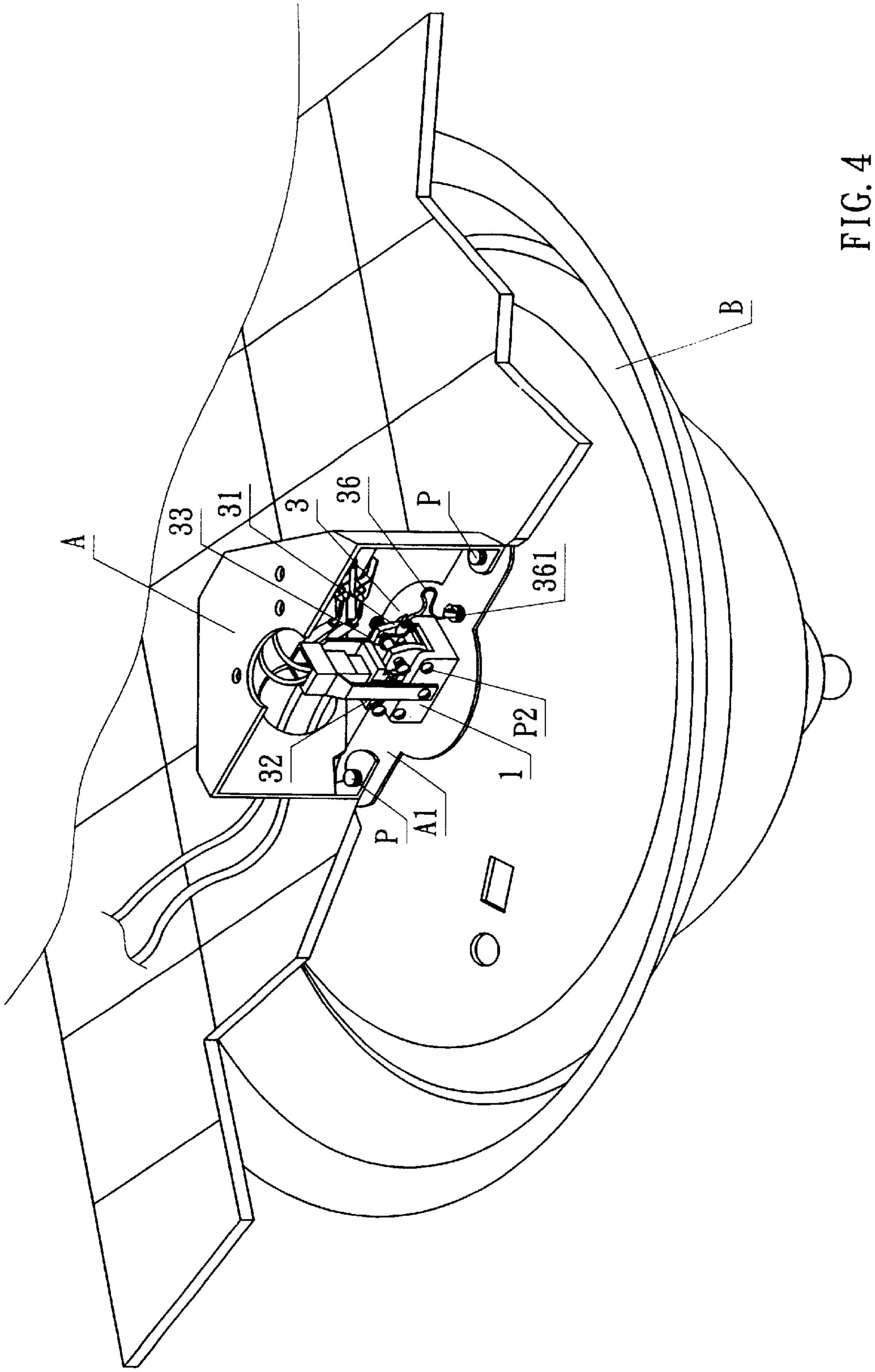
FIG. 4 is a diagram showing the pulling wire of a hanging lamp according to a preferred embodiment of the present invention.
Figure 5:
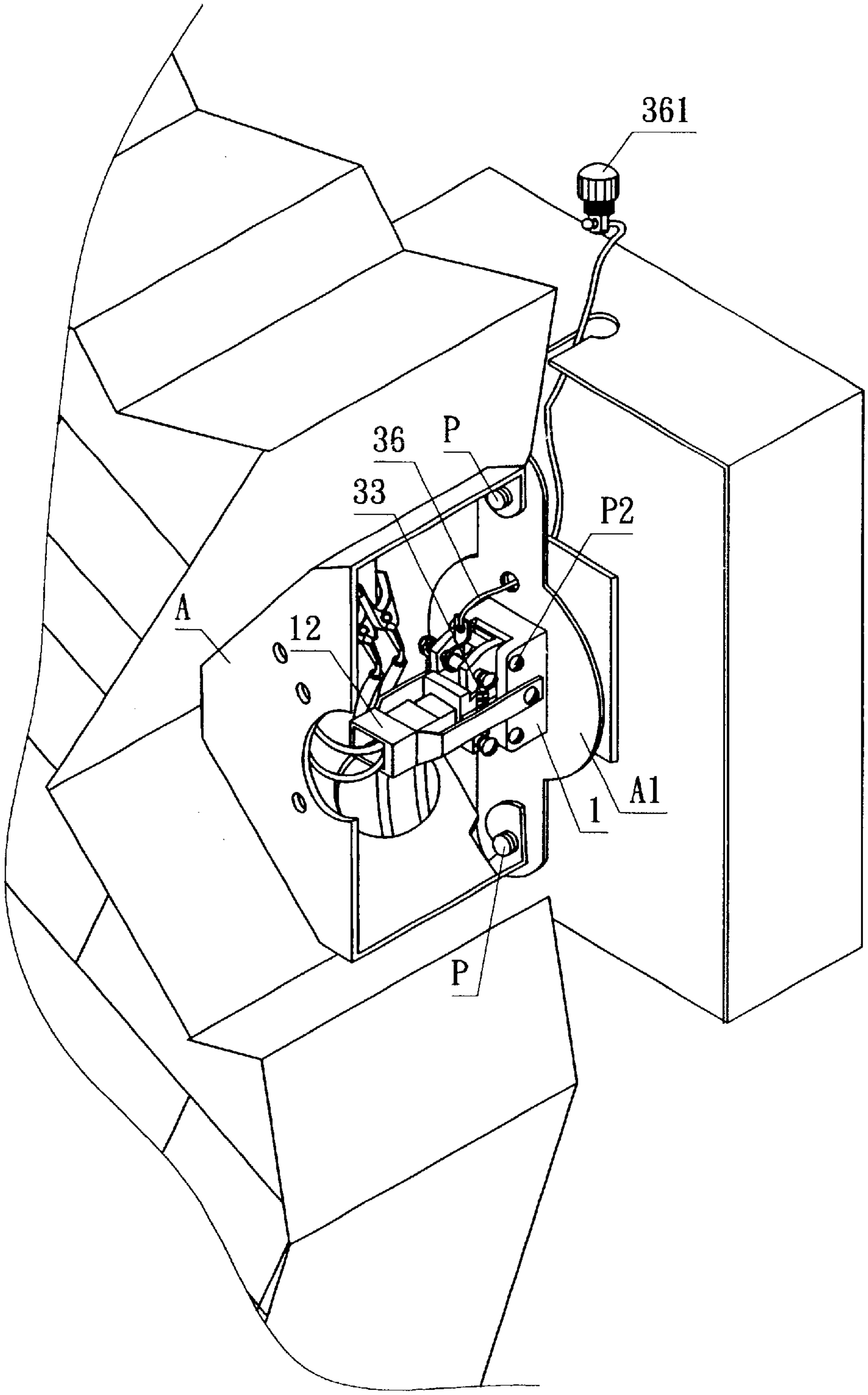
FIG. 5 is a diagram showing the pulling wire of a wall lamp according to a preferred embodiment of the present invention.

Please refer to FIGS. 4 and 5. The present invention is applicable to all kinds of lamps such as the hanging lamp, hanging fan, ceiling lamp, wall lamp, table lamp, etc; and the draw bar 34 for controlling the male and female limit members 31, 32 to expand outward or contract inward can be fixed to the connecting plate 35 with a wire head 36, and a screw bolt 361 is coupled to an end of the wire head 361 such that the screw bolt 36 can be fixed exactly to the outer lateral edge of the lamp body. When the user wants to remove the electric connector 2, the user just needs to unscrew the bolt 361 first and separate the lamp body B and the male and female limit members 31, 32 and be extended outward by pulling the bolt 361 and the connecting plate 35 at the same time, and separated from the embedding edge 22 of the electric connector 2 to facilitate the removal of the electric connector 2.

Figure 6:
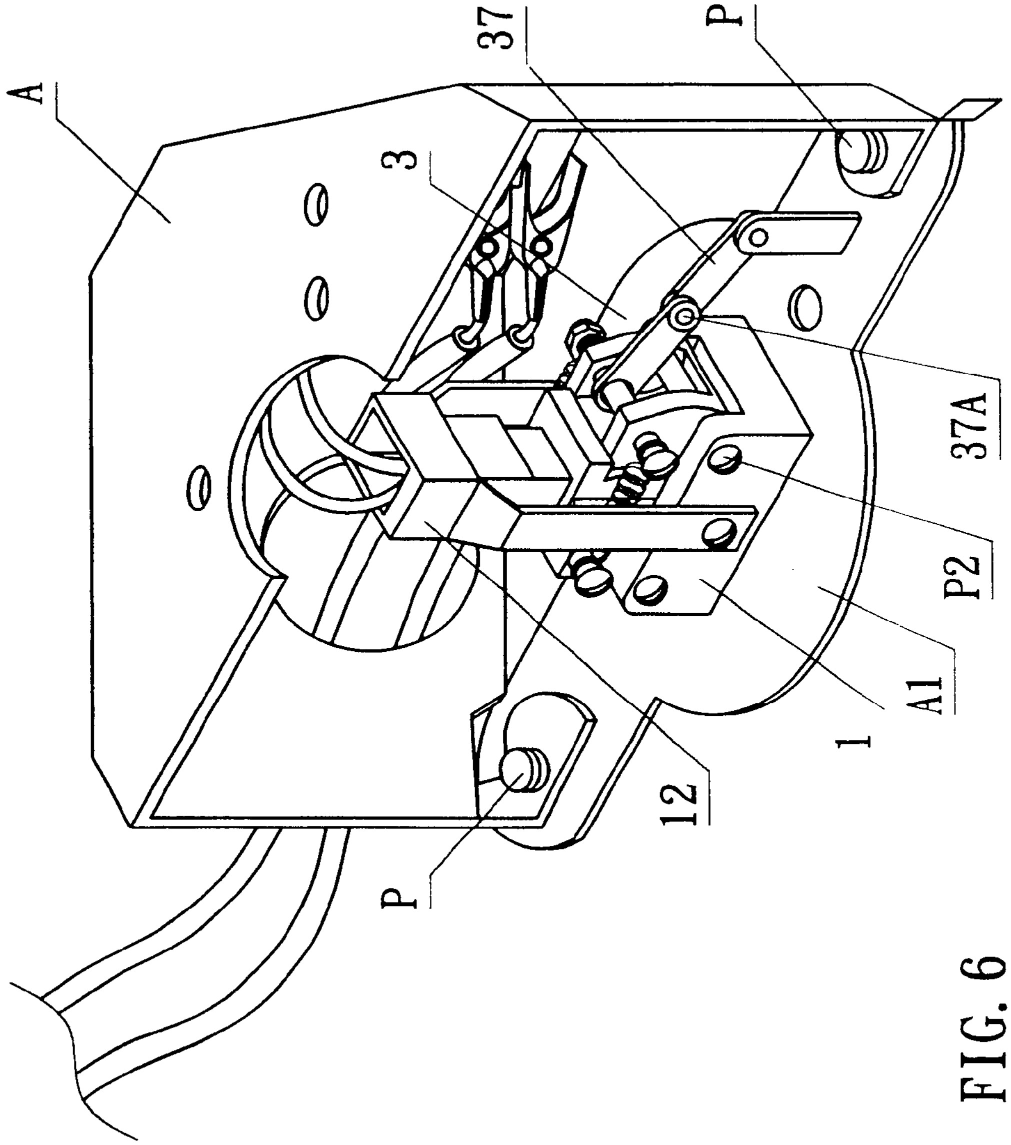
FIG. 6 is a diagram showing the pulling of associated bar of a lamp structure according to a preferred embodiment of the present invention.

Please refer to FIG. 6 for the draw bar 34 that controls the male and female limit members 31, 32 to expand outward or contract inward, and a 3-section associated bar 37 fixed onto the connecting plate 35; a pivotal coupling section 37A is disposed at the middle section of the associated rod 37. When the user wants to remove the electric connector 2, a hand tool K is used to push the pivotal coupling section 37A of the associating bar 37 upward so that the associating bar 37 moves the connecting plate 35 to bring the male and female limit members 31, 32 expand outward, and separates the embedding edge 22 of the electric connector to facilitate the removal of the connector 2.

Figure 7:
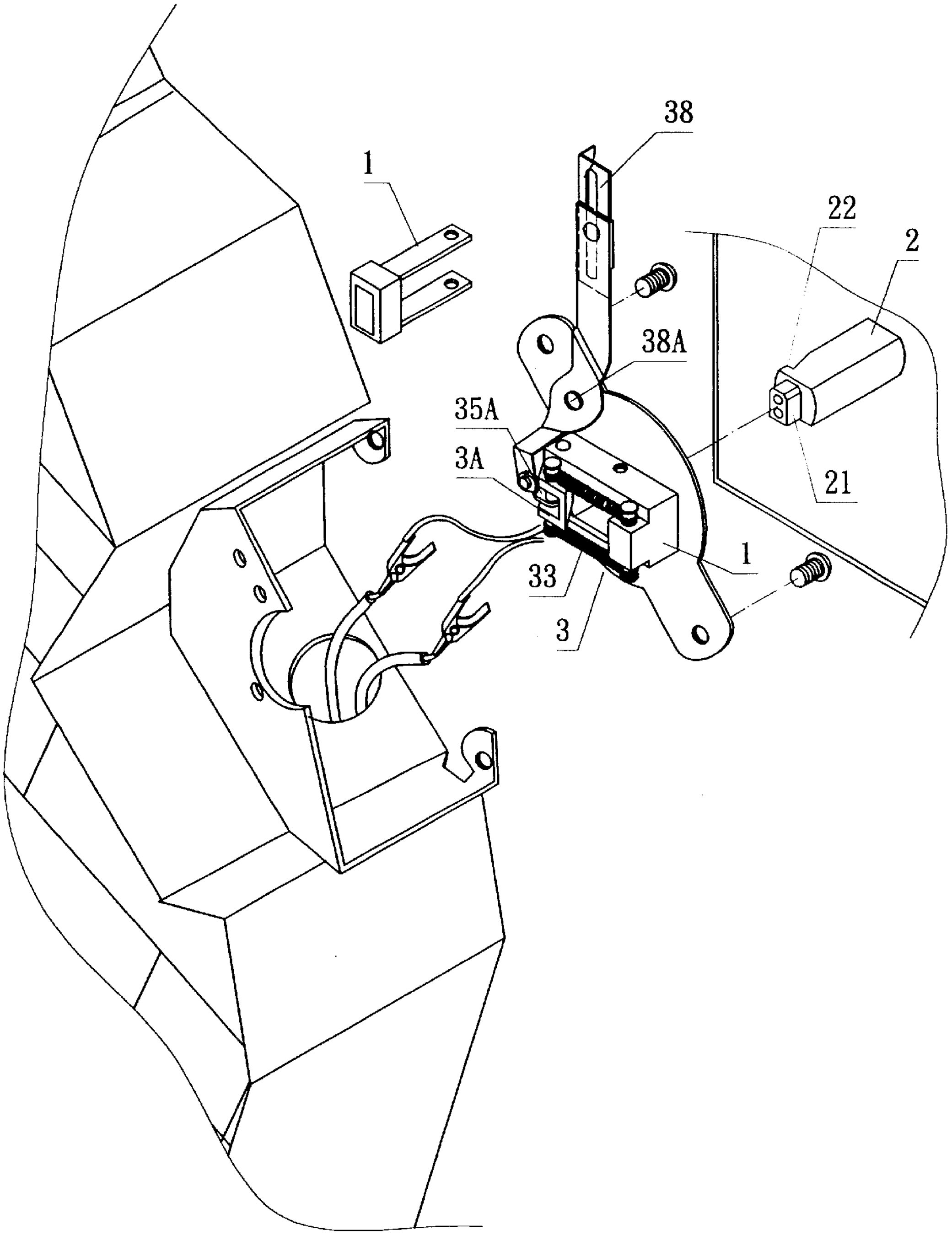
FIG. 7 is a diagram showing the pulling of the switching element of a wall lamp according to a preferred embodiment of the present invention.

Please refer to FIG. 7. The limit structure 3 can be fixed onto the hanger 1 by a single limit member 3A and a spring, and the limit member 3A has a wrenching rod 38 pivotally coupled onto the connecting plate. 35A at the outer side of the limit member 3A, and the vertical bent position or the wrenching rod 38 is pivotally exactly on the platform A1 of the switch box A. When the user wants to remove the electric connector 2, the users just needs to rotate the wrenching rod 38 by pressing its end and uses the pivotal coupling section 38A as the fulcrum, such that the coupled section of the wrenching rod 38 and the connecting plate 35A move the connecting plate 35 to bring the limit member 3A to expand outward, and separates the embedding edge of the electric connector 2 to facilitate the removal of the electric connector.

Figure 8:
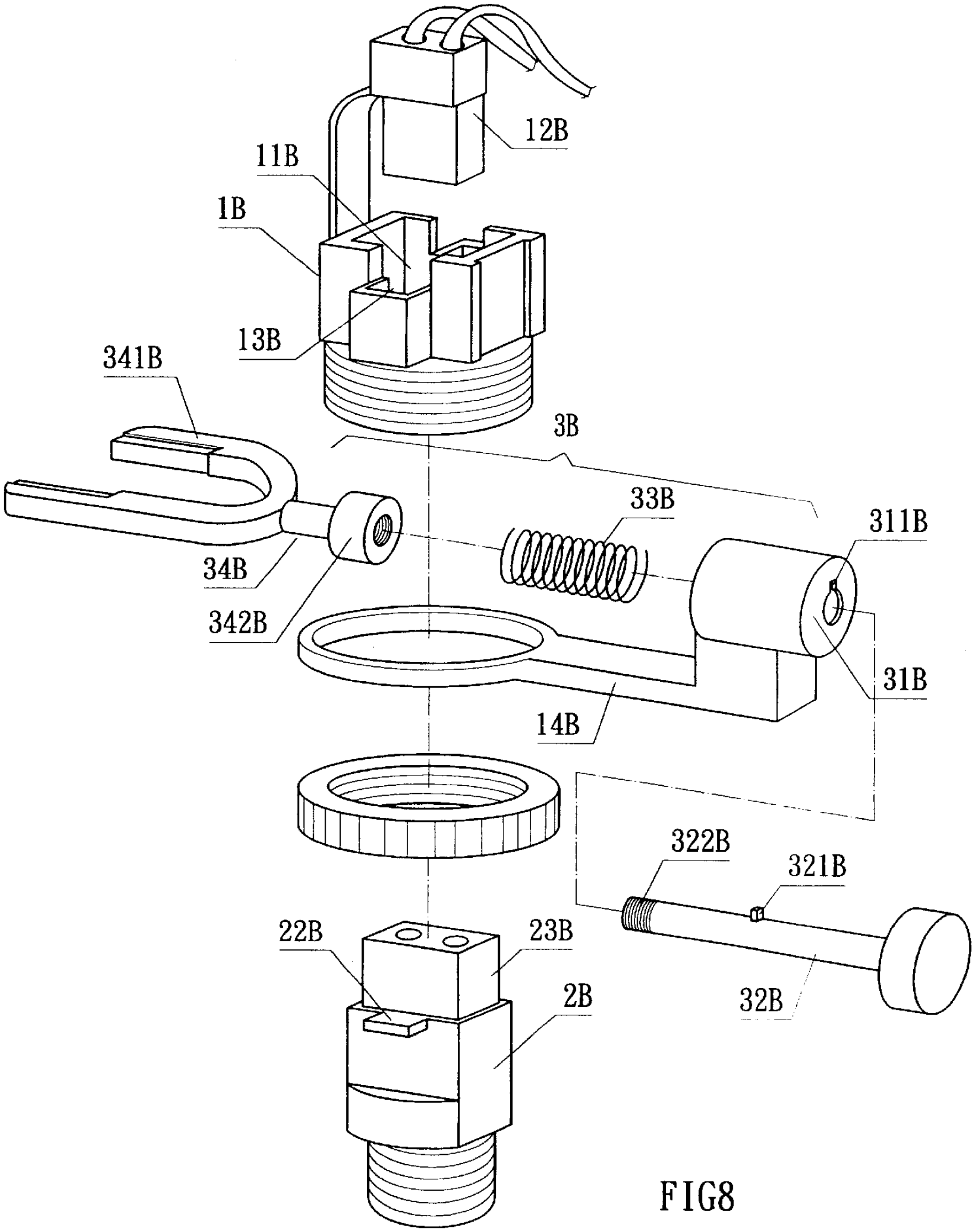
FIG. 8 is a diagram of another preferred embodiment of the present invention.

Please refer to FIG. 8. The present invention mainly comprises a hanger 1B disposed in the interior of the switch box A and an electric connector 2B fixed to the center of the top of the hanging lamp B; wherein a socket 12B with an electric wire is extended from the center of the hanger 1B and the socket 12B aligns at the upper section of the penetrating hole 11B at the center of the hanger 1B, and the penetrating hole 11B has a guiding connector 2B each protruded from both side of the penetrating hole 11B for fixing a wing hole 13B, and a supporting board 14B is extended horizontally from the bottom of the hanger 1B, and a limit structure 3 is disposed above the supporting board 14B.

The limit structure 3B comprises a bushing 31B above the supporting board 14B of the hanger, a control rod 32B passing through the bushing 31B, a spring 33B disposed on the control rod 32B, and a limit fork 34B fixed to the front end of the control rod 32B; wherein the control rod 32B has a protruded latching member 321B at the middle section of the control rod 32B. After the control rod 32B passes through the bushing 31B and the spring 33B, the control rod 32B is fixed to the end of the limit fork 34B to pull and limit the fork rod 34B. A latching protruded member 321B is disposed at the end of the bushing 31B passing through the opening 311B, and the fork section 341B at the front end of the limit fork rod 34B extends to the position above both sides fo the wing hole 13B, and the limit fork rod 34B aligns with the end of the control rod 32B, having a pushing ring 342B with a larger ring edge, and the pushing ring 342B exactly presses against the lateral side of the spring 33B such that limit fork rod 34B with its pushing ring 342B compresses the spring 33B as the control rod 32B is pulled back, and the limit fork rod 34B separates from the latch of the electric connector 2B.

The bottom of the electric connector 2B is fixed to the top of the hanging lamp B in advance, and the lateral side of the electric connector 2B has a wing hole 22B corresponsive to the wing hole 13B of the hanger 1B, and after the side wing 22B is protruded, it exactly forms an accommodating space S between the side wing holes 13B for limiting the fork rod 34B, and thus fixes the electric connector in a secured position, and the connector head section 23B at the top of the electric connector 2B can be inserted to the interior of the coupling base 12B of the hanger 1B.

Please refer to FIGS. 9A–9C for the assembly and the way of its movement. After the limit structure 3 compresses the spring 33B by pulling the control rod 32B backward to pull the pushing ring 342B of the limit fork rod 34B, the protruded latching member 321B of the control rod 32B is extended from the opening of the bushing 31B, rotating the control rod 32B to be fixed at the lateral side of the end of the bushing 31B so that the limit fork rod 34B simultaneously pulled back by the control rod 32B can be pulled back and separated from the hanger 1 (as shown in FIG. 9A). The electric connector 2B is passed from the bottom of the hanger 1B such that the side wing 22B of the electric connector and the side wing hole 13 of the hanger forms an accommodating space S for accommodating the insertion of the limit fork rod 34B (as shown in FIG. 9B). Then, the control rod 32B is rotated back to the protruded latching member 321B to align with the opening 311B of the bushing 31B. By the resuming of the spring 33B, the pushing ring 342B of the limit fork rod 34B resumes its original position such that the fork section 341 of the limit ford rod 34B can be extended exactly into the accommodating space S, and presses against the side wing 22B of the electric connector 2B in order to prevent the electric connector 2B from falling off (as shown in FIG. 9).

Figure 10:
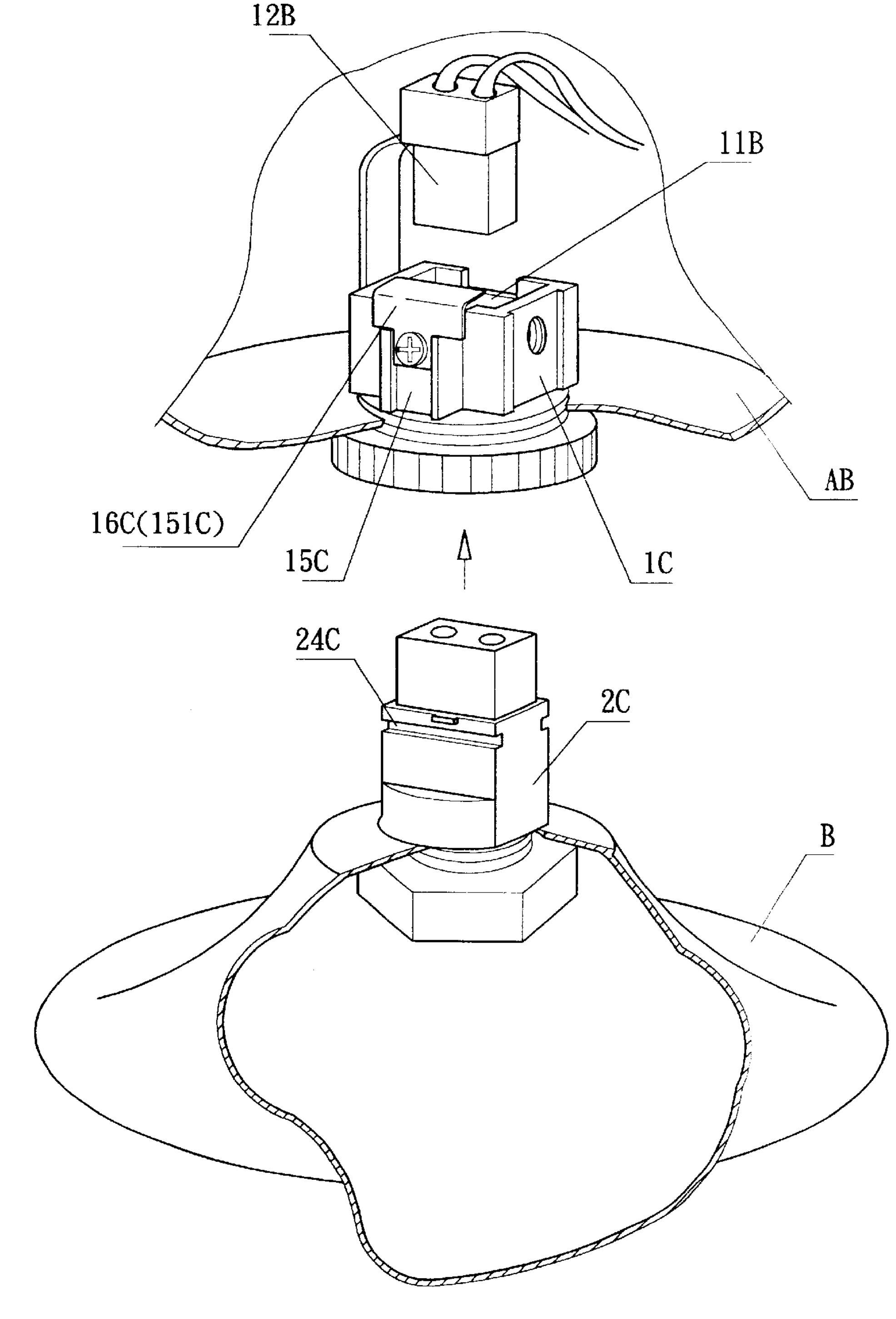
FIG. 10 is a diagram of another preferred embodiment of the present invention.

Please refer to FIG. 10. A lateral protruded member 15C is protruded from the side of the hanger 1*c*, and the lateral protruded member 15C has an embedding hole 151C on it, and a limit plate 16C in the penetrating hole exactly extended a bent section which is fixed to the bottom of the embedded hole 151C for embedding and latching the electric connector 2C, an embedding groove 24C is disposed on the side of the limit plate 16C which aligns with the electric connector 2C, and after the electric connector 2C is inserted from the bottom of the hanger 1C, the embedding groove 24C of the electric connector 2C is latched exactly onto the limit plate 16C of the hanger 1C in order to couple the hanging fan A and the hanging lamp B as a whole.

Since when the hanging fan and lamp is packaged, transported, or stored, the electric connector 2 with the lamp body B can be detached from the switch box A in advance to reduce the volume of the material for transportation and storage. Since when the user has bought the lamp home, the user just needs to insert the electric connector 2 of the lamp body into the hanger of the switch box for use, and it does not need any screwing tool providing a convenient way of the DIY assembling.

What is claimed is:

1. A multi-functional lamp structure assembly comprises: a hanger disposed at a center of an interior of a switch box, an electric connector being inserted into an interior of the hanger and fixed in a middle of said hanger, a platform being secured to both sides of a bottom of said switch box by screw bolts, a plurality of operating holes being disposed adjacent to both ends of said hanger, said hanger having a socket with electric wires being extended vertically upward from two sides of said socket, and a limit structure being disposed inside the hanger; said limit structure further comprising a male limit member and a female limit member, a plurality of draw bars being inserted into said penetrating holes, and a spring being fixed to both sides on the male limit member and female limit member; and the spring contracting the expanded male and female limit members to an appropriate extent, and an aligning end of each of said male and female limit members being substantially an aslant surface, said aslant surface forming a latching space capable for pushing and pulling; and each of said plurality of draw bars being fixed to an external side of the male and female limit members by a connecting plate; and the top of the electric connector having a connector head section being extended above the hanger, and the top of the connector head section being inserted inside the socket of the hanger; and the electric connector having an embedding edge on both sides of the electric connector, and said embedding edges being removably latched with the top of the male and female limit members, such arrangement can reduce the volume of material for transportation and storage and makes the assembling easier.

2. The multi-functional lamp structure as claimed in claim 1, wherein the draw bar of the limit structure has a wire head removably connected to the connecting plate.

3. The multi-functional lamp structure as claimed in claim 1, wherein the draw bar of the limit structure is fixed to the connecting plate by a three-sectional associating rod, having a pivotal coupling section, such that when a hand tool pushes the pivotal coupling section of the associating rod upward, the associating rod moves the connecting plate to drive the male and female limit members outward thereby separating the embedding edge of the electric connector.

4. The multi-functional lamp structure as claimed in clam 1, wherein the limit structure is connected to the hanger by a single limit member and a spring fixed on the hanger, the limit member has a wrenching rod pivotally connected to the connecting plate at the outer side of the limit structure, and a vertical bending position of the wrenching rod being disposed on a platform of the switch box, such that pushing the end of the wrenching rod at the pivotal coupling section as the fulcrum, the coupling position of the wrenching rod and the connecting plate moves the limit member to expand outward and separates the embedding edge of the electric connector.

5. The multi-functional lamp structure assembly comprises: a hanger being installed in an interior of a switch box for a hanging fan and an electric connector being inserted inside said hanger, wherein: said hanger has a socket at a top of said hanger with electric wires, and a wing hole protruded from both sides of the hanger, and a supporting board extended horizontally from a bottom of the hanger, and a limit structure being disposed on the supporting board, said limit structure further comprising a hollow bushing fixed on the supporting board, a control rod passing through the bushing, a spring disposed on the control rod, and a limit fork being fixed onto a front end of the control rod; wherein the control rod passes through the bushing and the spring in sequence, and then fixed to the end fo the limit fork, the limit fork being extended above the wing hole on both sides of the hanger, and the limit fork having a pushing ring with large ring edge, and the pushing ring being pressed by one end of the spring; and said electric connector having a side wing corresponding to the side wing hole of the hanger being disposed on the lateral side of the electric connector, and an accommodating space for the insertion of the limit fork being disposed between the side wing and the side wing hole; after the electric connector being inserted into the hanger, a connector head section at a top of the electric connector being inserted into a socket, such arrangement can reduce the volume of material for transportation and storage and makes the assembling easier.

6. The multi-functional lamp structure as claimed in claim 5, wherein the control rod of the limit structure has a protruded latching member, the protruded latching member being inserted into an opening in the bushing.

7. The multi-functional lamp-structure as claimed in claim 5, wherein the electric connector at a bottom has a screw thread section, the screw thread section passing through the hanging lamp, the hanging lamp being fixed to a stop of the screw thread section by screw nuts.

8. A multi-functional lamp structure assembly comprises: a hanger being installed in an interior of a switch box for a hanging fan; and an electric connector being inserted inside said hanger, wherein: said hanger having a socket at the top of said hanger with electric wires, and a wing hole protruded from both sides of the hanger, the hanger having a protruded member with an embedding hole on both sides thereof, a limit plate with a bending section removably connected to the embedding hold of the hanger, the limit plate removably engaging an embedding groove on the electric connector such that the electric connector is removably fixed to the hanger, a connector head section at a top of the electric connector being inserted into a socket, such arrangement can reduce the volume of material for transportation and storage and makes the assembling easier.

* * * * *